Sept. 11, 1956 P. ROSENBERG 2,762,373

CARD FILING DEVICE

Filed Sept. 12, 1950 3 Sheets-Sheet 1

INVENTOR.
Paul Rosenberg
BY
Cushman, Darby & Cushman
ATTORNEYS

Sept. 11, 1956

P. ROSENBERG 2,762,373

CARD FILING DEVICE

Filed Sept. 12, 1950

3 Sheets-Sheet 2

INVENTOR.
Paul Rosenberg
BY
Cushman, Darby & Cushman
ATTORNEYS

Sept. 11, 1956 P. ROSENBERG 2,762,373

CARD FILING DEVICE

Filed Sept. 12, 1950 3 Sheets-Sheet 3

INVENTOR.
Paul Rosenberg
BY
Cushman, Darby & Cushman
ATTORNEYS

United States Patent Office 2,762,373
Patented Sept. 11, 1956

2,762,373

CARD FILING DEVICE

Paul Rosenberg, Larchmont, N. Y., assignor, by mesne assignments, to Simpla Research and Mfg. Co., New York, N. Y., a corporation of New York Application September 12, 1950, Serial No. 184,443

6 Claims. (Cl. 129—16)

This invention relates to card filing devices, and particularly to file cards adapted for use therein. It has long been desired to devise satisfactory means to make a selected group of file cards, supported on a tray, drum or the like, stand apart from each other in spaced relationship, so that the top edges of several cards may be viewed with facility, and almost simultaneously. Many proposals have previously been made to attain this end, but each of these involves bulky or expensive elements, or other inherent disadvantages resulting in an impractical or unsatisfactory device.

It is an object of the present invention to provide a file card having a permanently magnetized portion spaced from an edge thereof, adapted to repel the similarly magnetized portions of adjacent cards.

Another object of the invention is to provide a file card adapted to repel similar cards by permanent magnetic forces emanating solely from the cards.

A further object of the invention is to provide a card filing device comprising file cards adapted to stand apart from each other in spaced relationship merely by permanent magnetic forces, without external assistance.

Another object is to provide a card filing device comprising file cards adapted to stand apart from each other by permanent magnetic forces alone, wherein said forces are unaltered by reversal of one or more of the cards.

Still another object is to provide a card filing device comprising file cards adapted to repel each other by permanent magnetic forces, said forces being effective to maintain a card, when raised out of alignment, in elevated position relative to adjacent cards, until positively returned to alignment.

Further objects will be in part obvious and in part pointed out hereinafter.

The invention and the novel features thereof may best be made clear from the following description and the accompanying drawings, in which.

Figures 13, 14, 15, 17:
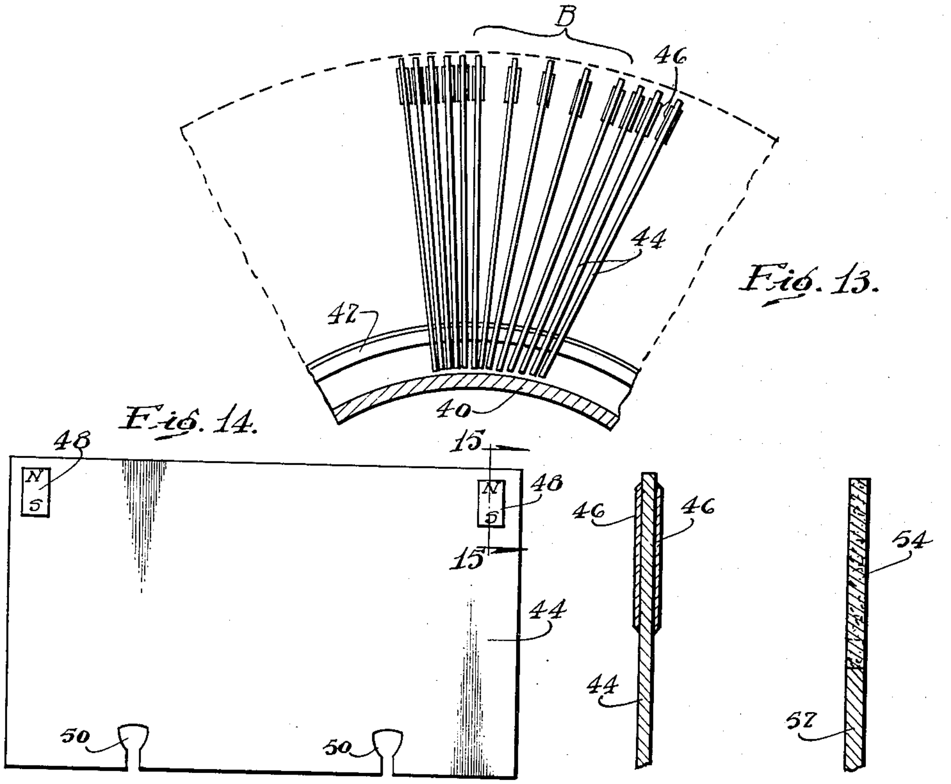
Figure 13 is a side elevational view of a portion of a drum filing device, provided with a plurality of file cards having permanently magnetized portions spaced from the engaged edges thereof, showing the operative relationship of the cards.
Figure 14 is an elevational view of still another embodiment of the invention.
Figure 15 is an enlarged sectional view taken on the line 15—15 thereof.
Figure 18:
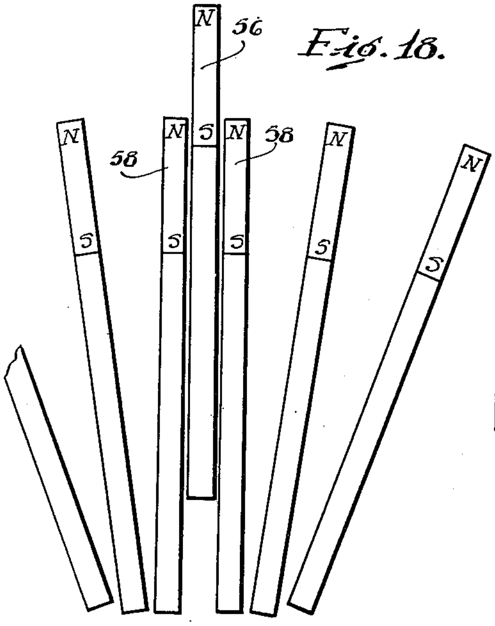
Figure 16:
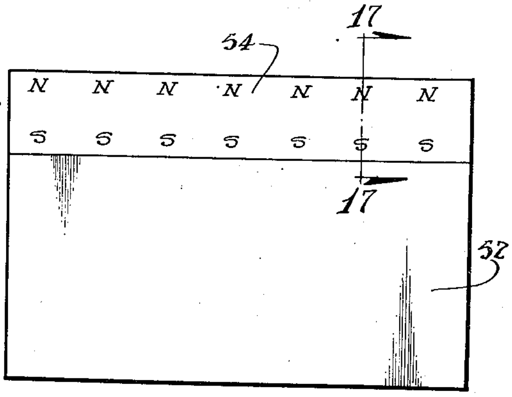

Figure 16 is an elevational view of yet another embodiment of the invention, and Figure 17 is an enlarged sectional view taken on the line 17—17 thereof, and Figure 18 is an enlarged end elevational view illustrating the relationship of a plurality of cards of the types shown in Figures 14 and 16, and the manner in which adjacent cards will maintain a card therebetween in elevated position, when so raised.

Figure 1:
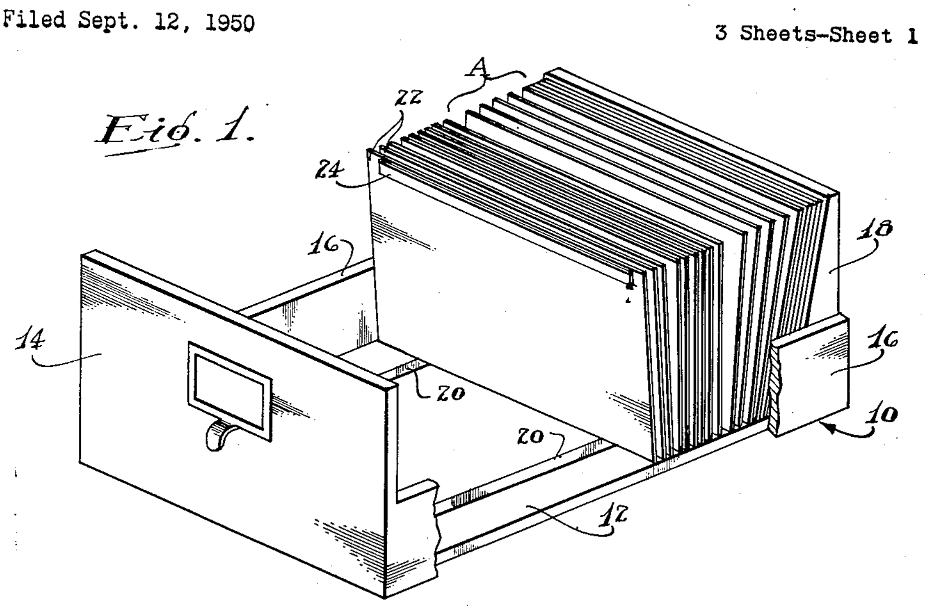
Figure 1 is a perspective view, partly broken away, of a filing card tray containing a plurality of file cards of the present invention, illustrating the operative relationship thereof.

Referring to the drawings, in Figure 1 is shown a filing tray 10 of conventional design, comprising the usual bottom 12, front wall 14, side walls 16 and rear wall 18. The bottom 12 may be provided with one or more card supporting or engaging members such as rails 20, which may be made of metal, rubber or other material. Supported on the rails is a plurality of file cards 22, each provided on both sides thereof at a point spaced from its supported edge with an elongated permanently magnetized element 24.

Figure 2:
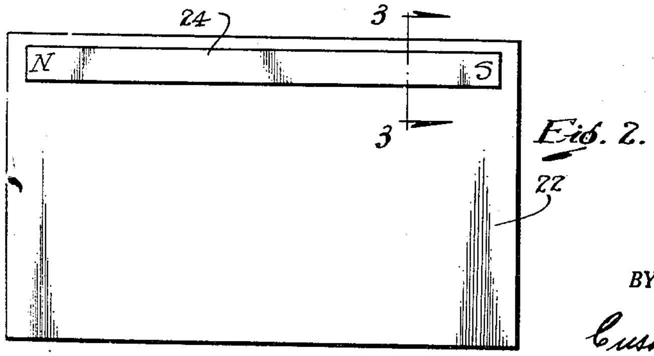
Figure 2 is an elevational view of a simplified file card constructed according to the present invention.
Figure 3:
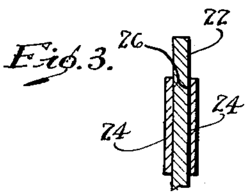
Figure 3 is an enlarged sectional view through the card of Figure 2, taken on the line 3—3 thereof.

The cards 22 are illustrated in Figures 2 and 3, wherein the magnetized elements 24 are composed of metal or other material suitable for permanent magnetization, and are affixed to both surfaces of the cards adjacent the upper edges thereof in any convenient manner, as by gluing along the lines 26, by stapling or other means. The magnetized elements 24 may be permanently magnetized with polarity as illustrated in Figure 2, with opposite poles located at opposite ends thereof. So constructed, it will be evident that filing cards disposed in adjacency and alignment will repel each other at points corresponding to the position of the magnetized elements, so that where permitted by space limitations within a tray or other filing device, a plurality of adjacent cards will assume a substantially evenly spaced relationship relative to each other, as shown in the region A of Figure 1. The cards will automatically assume such relationship whenever and wherever space permits, and it will be evident that the spaced region A may be displaced along the row of cards by finger movement to close the spaces between cards at one point and afford space for spreading at another. This property of the filing device permits a user to view the top edges of a plurality of cards with great facility, almost simultaneously, so that the entire file may be scanned with rapidity to select a desired card, or for similar purpose. The magnetized elements must necessarily possess fields of sufficient strength to adequately repel similar fields, and desirably are sufficiently thin and flexible to permit easy bending of the card for passage through a typewriter and for similar purposes. This result may be readily obtained with many modern permanently magnetizable materials, which may include metals, alloys, metallic oxides, magnetic inks, paints and plastics, and other materials possessing the requisite magnetic strength and permanence.

Examples of suitable permanently magnetizable materials are the alloys identified by the trade names of "Alnico 4" and "Alnico 5," which have the following chemical composition (approximate only):

*Alnico 4*

| | Per cent |
|---|---|
| Aluminum | 12 |
| Nickel | 28 |
| Cobalt | 5 |
| Iron | 55 |

*Alnico 5*

| | Per cent |
|---|---|
| Aluminum | 8 |
| Nickel | 14 |
| Titanium | 1 |
| Cobalt | 24 |
| Copper | 3 |
| Iron | 50 |

Particularly suitable materials are the alloys known by the trade names of "Vicalloy I" and "Vicalloy II," which nominally have the following approximate composition:

| | Vicalloy I | Vicalloy II |
|---|---|---|
| | *Percent* | *Percent* |
| Cobalt | 52 | 52 |
| Vanadium | 9.5 | 13 |
| Iron | 38.5 | 35 |

These materials are readily fabricated into thin strips, which are flexible and mechanically strong.

Figure 4:
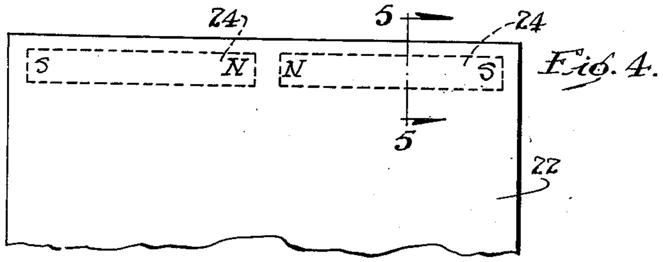
Figure 4 is an elevational view of another file card constructed according to the present invention.
Figure 5:
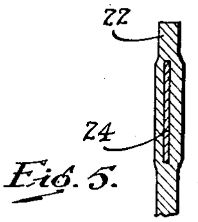
Figure 5 is an enlarged sectional view of the card of Figure 4, taken on the line 5—5 thereof.

In Figures 4 and 5 is illustrated another embodiment of the invention, wherein a card is provided with a plurality of permanently magnetized elements, arranged in bi-lateral symmetry relative to the vertical center line of the card. With this arrangement, as will be readily understood, one or more cards in the filing device may be reversed about its axis of symmetry, its top edge remaining on top, without affecting the magnetic field thereof relative to that of adjacent cards, whereby the ability of the cards to stand apart due to their magnetic fields will be unimpaired by such reversal of any or all. As also shown in Figure 5, instead of magnetized elements on each surface of the card, a single magnetized element or row of magnetized elements may be employed, included in the interior of the card. While only two elements have been illustrated in Figure 4, it will be obvious that a greater number may be employed, so long as bi-lateral symmetry is maintained. The embodiment illustrated in Figure 5 is slightly bulged out by reason of inclusion of the elements 24 therewithin. Obviously, it is possible to reduce this bulge to negligible dimensions by calendering the card after insertion of the element, or the element may be included in the card during or subsequent to manufacture in such manner as to leave the outer card surfaces perfectly planar.

It has been found that the location of like poles relatively close to each other on each card, as is the case with the north poles in Figure 4, spreads the lines of magnetic force outwardly from the face of the card in a manner effecting particularly strong forces of repulsion at such point. This effect may be enhanced to maximum degree by employing magnetized elements 28 of horseshoe shape, as shown in Figure 6, arranged in bi-lateral symmetry with both north and south poles disposed close to each other, whereby maximum repulsive effect between like cards may be attained.

Figure 6:
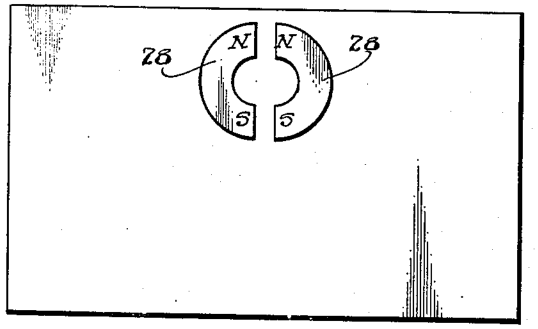
Figure 6 is an elevational view of still another file card.
Figure 7:
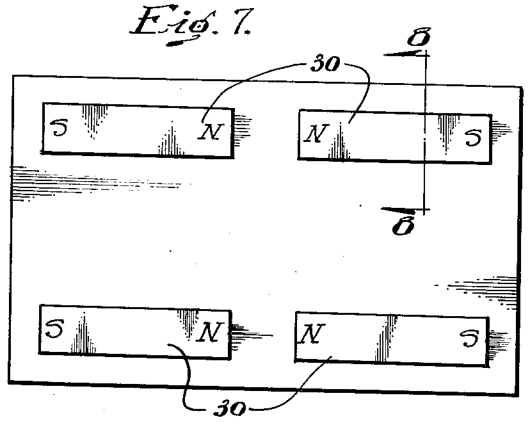
Figure 7 is an elevational view of yet another file card.

The modifications of Figures 4 and 6 are symmetrical relative to a single axis of the card. If desired, cards may be constructed according to the invention which are doubly symmetrical, that is, bi-laterally symmetrical with respect to both the longitudinal and transverse axes of the cards. So constructed, a card may be turned front to back by rotation around either axis, without losing its ability to stand apart from similar cards in alignment therewith by magnetic repulsion. An example of such a doubly symmetrical arrangement is shown in Figure 7, wherein the card is provided with four magnetized elements 30, arranged in bi-lateral symmetry with respect to both axes of the card. Numerous other arrangements may be resorted as to effect the same end.

Figure 8:
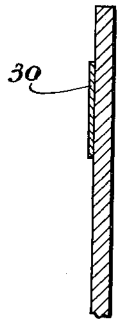
Figure 8 is an enlarged sectional view of the card of Figure 7, taken on the line 8—8 thereof.

As shown in Figure 8, cards may be constructed according to the invention with a permanently magnetized element affixed to only one side thereof, the magnetic fields of force being capable of acting through the paper of the file card in substantially the same manner as through air.

Figure 9:
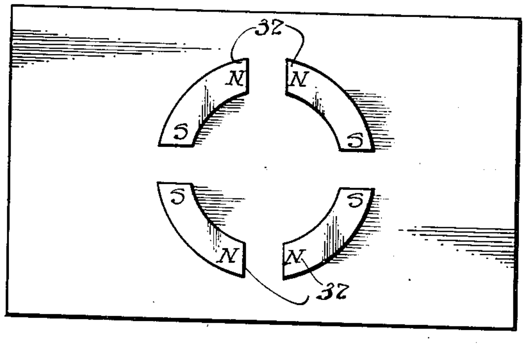
Figure 9 is an elevational view of still another file card.

A particularly effective arrangement for a doubly symmetrical card is illustrated in Figure 9, wherein the card is provided with four curved magnetized elements 32, arranged with like poles of the elements disposed in adjacency to each other, whereby the maximum repulsive effect previously referred to may be attained.

Figure 10:
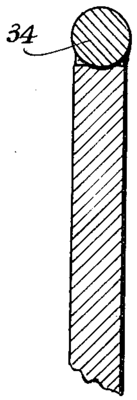
Figures 10, 11 and 12 are sectional views illustrating further embodiments of the invention.
Figure 11:
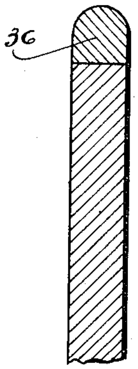
Figure 12:
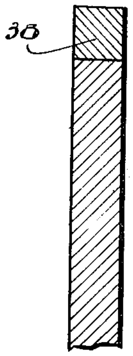

According to other embodiments of the invention, the magnetic elements may take the form of wires or thin bars, or segments thereof, fastened to edges of the cards. Desirably, the thickness of these elements will not exceed the thickness of the card itself. One such embodiment is illustrated in Figure 10, wherein the magnetized element comprises a wire 34, suitably affixed, as by gluing, to an edge of the card. As shown in Figure 11, the magnetized element may take the form of a rounded bar 36, or the element may be in the form of a bar 38 of square cross section, as shown in Figure 12, whereby the over-all shape and appearance of the card are not altered. Provision of the magnetized elements in the form of a wire or bar fastened to edges of the cards effects a file card readily inserted and used in typewriters or similar machines. Further advantages of these embodiments reside in the stiffening effect imparted to the card edges by the wires or bars, whereby they are made more sturdy, and the top edges thereof may be protected from wear and tear incidental to handling or riffling of the cards.

Figure 13 illustrates another conventional card filing device, comprising a drum 40 provided with the usual rails 42 to which may be engaged a plurality of file cards 44. The file cards being provided with permanently magnetized portions 46 spaced from their engaged edges, they will stand apart at their outer edges where permitted by space limitations, as shown in the region B of this figure.

The file cards 44 may be constructed according to still another embodiment of the invention, and provided with one or more magnetized portions 48 having poles spaced apart in the direction normal to the engaged card edge, as shown in Figures 14 and 15. If a plurality of magnetized portions is employed, they may be permanently magnetized so as to be of corresponding polarity, that is, with all north poles or with all south poles outermost, so that again the polarity of the cards will be bi-laterally symmetrical relative to the vertical center line thereof. By duplicating and reversing the magnetized portions relative to the horizontal center line of the cards, the cards may be made doubly symmetrical. As shown, the cards 44 are provided with the usual notches or slots 50, adapted for engagement with rails 42. The magnetized portions 46 may be applied in any manner previously described, in the form of distinct members applied to one or both surfaces of each card, or as single members included in the interior of each card. If desired, however, the permanently magnetized portions may be affixed to the cards in the form of a coating of magnetic ink, paint or the like, containing permanently magnetizable material and a suitable binder. In this form of the invention, obviously, the magnetized portions may be applied by printing, spraying, brushing or in similar fashion.

Still another embodiment of the invention is illustrated in Figures 16 and 17, wherein a file card 52 comprises an edge portion 54 filled or impregnated with magnetized material. The magnetic material may be permanently magnetized as illustrated in Figure 16, with poles spaced vertically or in the direction normal to the engaged or supported edge of the card.

The embodiments of the invention illustrated in Figures 14 and 16 function not only to maintain the cards, where permitted by space limitations, in spaced relationship, solely by reason of the magnetic fields of the permanently magnetized portions thereof, but possess an additional function illustrated in Figure 18. The poles of the magnetized portions being vertically spaced, that is, spaced in the direction normal to the supported edge, a single card 56 may be elevated out of alignment with adjacent cards 58 to the position shown in the figure, whereby the lower pole of the elevated card 56 will be brought into alignment with the upper poles of the adjacent cards 58. In this event the upper poles of adjacent cards 58 (illustrated as north) and the lower pole of raised card 56 (illustrated as south) will mutually attract each other, and the three cards will assume the relationship shown, whereby the raised card is retained in elevated position by the adjacent cards clinging thereto.

Accordingly, a card to which future reference is to be made may be elevated slightly relative to the filing device, and will remain so elevated for any desired period of time. When such demarcation is no longer desired, the elevated card may be pushed back into place by slight finger pressure, whereupon the cards will resume their normally spaced relationship.

It will be understood that separation of the file cards may be accomplished by locating the permanently magnetized areas at any position on the cards spaced from the edges thereof which are restrained from separation. This restraint may be applied either by pressure of adjacent cards, as in the case of a drum or tray file, or the restraint may be applied by resting the cards on a rubber floor or on rubber rails, whereby the bottom edges thereof are prevented from sliding apart from each other. The effectiveness of the force separating the cards varies directly with the spacing of the magnetized elements from the restrained edges. On the other hand, the force of repulsion between magnetized areas on adjacent cards varies approximately with the inverse square of the distance separating adjacent areas, whereby it is advantageous to position the magnetized areas close to the restrained edges, so that the distance between magnetized areas is less than the distance of separation between the outer edges of the cards. The optimum location of the magnetized areas will depend, then, upon a number of interrelated factors, including the strength and shape of the fields produced by the particular magnetic elements used, the weight of the magnetic elements, and the degree of concentration of the magnetic areas in one portion of the cards.

Generally, it will be advantageous to position the magnetic areas at or somewhat above the mid-points of the cards, relative to the restrained edges, this being a compromise between location of the magnetic areas at the card tops where a given repulsive force has the greatest effectiveness in separating the cards, and location of the magnetic areas near the restrained edges, where the repulsive force is considerably greater, when the spacing between outer edges of the cards is the same.

If the cards are supported without restraint, the magnetized areas may still be located anywhere thereon, provided that the resultant of the forces of repulsion between adjacent cards acts at or above the mid-points of the cards, relative to the supported edges, if the cards are homogeneous and have vertical symmetry. If the cards are non-homogeneous and do not have vertical symmetry, the magnetic forces must act at or above the center of gravity of the cards.

It is obviously desirable that opposite poles of a single magnetized element be separated a distance greater than the distance by which the upper edges of adjacent cards are to be separated, since the force of attraction between a north pole on one card and a south pole on the next begins to compare in magnitude to the force of repulsion between a north pole on the first card and a north pole on the second when the spacing between cards approaches the spacing between poles on magnetized elements of each card.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A pack of filing cards adapted for use with a filing tray or the like, each card having a normal supporting edge and a permanently magnetized portion of the same size, relative position and pole disposition as the others, whereby when the cards are supported on said edges in substantially upright relation with said portions in registry, they are mutually repellent and tend to separate, said portion in each card being spaced from its normal supporting edge, the poles of said magnetized portion being disposed in bi-laterally symmetrical relation to the card center line perpendicular to said supporting edge.

2. A pack of file cards in accordance with claim 1 in which each card has an elongated permanently magnetized portion spaced from and parallel to the supporting edge thereof, the poles of said magnetized portion being spaced from each other in the direction of said edge, said magnetized portion being bi-laterally symmetrical as to polarity.

3. A card filing device comprising card support means, a plurality of file cards edge supported on said support means, each of said cards having an elongated permanently magnetized portion spaced from its supported edge, the poles of the magnetized portions of said cards being disposed in a manner bi-laterally symmetrical relative to the card center lines normal to said supported edges.

4. A device according to claim 3, wherein the poles of the magnetized portions of said cards are spaced in the direction of the supported edges thereof.

5. A device according to claim 3, wherein the poles of the magnetized portions of said cards are spaced in the direction normal to the supported edges thereof.

6. A device according to claim 3, wherein the poles of the magnetized portions of said cards are disposed in a manner bi-laterally symmetrical relative to the card center lines parallel to said supported edges.

References Cited in the file of this patent

UNITED STATES PATENTS 2,341,639 Mathiesen ------------ Feb. 15, 1944

FOREIGN PATENTS 68,365 Norway ---------------- Oct. 9, 1944

631,466 Great Britain ----------- Nov. 3, 1949